United States Patent
Kitano et al.

(10) Patent No.: US 10,168,529 B2
(45) Date of Patent: Jan. 1, 2019

(54) ENDOSCOPE

(71) Applicant: FUJIFILM Corporation, Tokyo (JP)

(72) Inventors: Ryo Kitano, Kanagawa (JP); Takashi Yashiro, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 146 days.

(21) Appl. No.: 15/293,302

(22) Filed: Oct. 14, 2016

(65) Prior Publication Data

US 2017/0108692 A1 Apr. 20, 2017

(30) Foreign Application Priority Data

Oct. 15, 2015 (JP) ................. 2015-203816

(51) Int. Cl.
*G02B 23/24* (2006.01)
*H04N 5/225* (2006.01)

(52) U.S. Cl.
CPC ..... *G02B 23/2484* (2013.01); *G02B 23/2469* (2013.01); *H04N 5/2253* (2013.01); *H04N 2005/2255* (2013.01)

(58) Field of Classification Search
CPC ....... A61B 1/051; A61B 1/00096; A61B 1/05; A61B 1/0011; A61B 1/00114; A61B 1/00124; A61B 1/0607; A61B 1/00018; A61B 1/04; A61B 1/00135; A61B 1/07; A61B 1/127; A61B 1/0051; A61B 1/018; A61B 1/041; A61B 1/0676; A61B 1/0684; A61B 1/00126; A61B 1/0669; A61B 1/128; A61B 1/307; A61B 1/0008; A61B 1/00163; A61B 1/00193; A61B 1/005; A61B 1/042; A61B 1/00009; A61B 1/00016; A61B 1/00066; A61B 1/00101; A61B 1/00128; A61B 1/00177
See application file for complete search history.

(56) References Cited

U.S. PATENT DOCUMENTS

| 2012/0197081 A1* | 8/2012 | Kimura | A61B 1/00124 600/110 |
| 2015/0238069 A1* | 8/2015 | Osada | A61B 1/05 600/109 |
| 2016/0029879 A1* | 2/2016 | Ishikawa | A61B 1/00114 600/110 |
| 2017/0255001 A1* | 9/2017 | Yamashita | G02B 23/2484 |

FOREIGN PATENT DOCUMENTS

| JP | 2013-123628 | 6/2013 |
| JP | 2014-204275 | 10/2014 |
| JP | 2015-062555 | 4/2015 |

* cited by examiner

*Primary Examiner* — Anand S Rao
*Assistant Examiner* — Samuel D Fereja
(74) *Attorney, Agent, or Firm* — JCIPRNET (57) ABSTRACT

An endoscope includes an image sensor that is provided at a front end portion of an insertion portion of the endoscope so that an image receiving surface of the image sensor is disposed to cross a longitudinal axis of the insertion portion; a sensor holder that surrounds an outer circumference of the image sensor and holds the image sensor; and a circuit board including a sensor connection portion and an electric wire connection portion as defined herein; the image sensor is held by the sensor holder as defined herein; the sensor connection portion and the electric wire connection portion are connected to each other as defined herein; and an outside edge of a connection site between the sensor connection portion and the electric wire connection portion is located as defined herein.

16 Claims, 10 Drawing Sheets

ENDOSCOPE

CROSS-REFERENCE TO RELATED APPLICATIONS

This application claims the benefit of Japanese Patent Application JP 2015-203816, filed Oct. 15, 2015, the entire content of which is hereby incorporated by reference, the same as if set forth at length.

FIELD OF THE INVENTION

The present invention relates to an endoscope.

BACKGROUND OF THE INVENTION

An imaging device to be mounted on a front end portion of an insertion portion of an endoscope is generally provided with an image sensor and a circuit board on which the image sensor is mounted. A plurality of electric wires inserted into the insertion portion are connected to the circuit board. A flexible circuit board that can be folded to be comparatively small is typically used as the circuit board. However, a rigid circuit board may be used in some case (for example, see JP-A-2013-123628, JP-A-2014-204275 and JP-A-2015-62555).

SUMMARY OF THE INVENTION

There is a request for further reduction in diameter of an insertion portion of an endoscope. With reduction in diameter of the insertion portion, it is also requested to miniaturize an imaging device to be mounted on a front end portion of the insertion portion. In an imaging device in which an image receiving surface of an image sensor is disposed substantially perpendicularly to a longitudinal axis of the insertion portion, it is essential to miniaturize the image sensor. For example, it is requested to use an image sensor whose outer shape is extremely small enough to fall in an area 1 mm square.

In order to miniaturize the imaging device, it is also essential to miniaturize a circuit board on which the image sensor is mounted. In an imaging device disclosed in JP-A-2014-204275, a flexible circuit board is folded so that the flexible circuit board can fall inside the outer circumference of an image sensor in view along a direction parallel with the longitudinal axis of the insertion portion. Thus, it is intended to miniaturize the circuit board.

However, when the flexible circuit board is folded so that the flexible circuit board can fall inside the outer circumference of the image sensor, a bent portion of the flexible circuit board is provided near lands of the flexible circuit board. The lands should be connected to terminals of the image sensor. The distance between each land and the bent portion is reduced as the image sensor is smaller. When the distance between the land and the bent portion is reduced, there is a fear that the land of the flexible circuit board may be separated from a corresponding terminal of the image sensor as soon as the circuit board is bent.

In an imaging device disclosed in JP-A-2013-123628, a support member for supporting a back surface of a flexible circuit board opposite to a surface on which an image sensor should be mounted is provided. A bending start point of the flexible circuit board is set by the support member so that separation between each terminal of the image sensor and each land of the flexible circuit board can be suppressed. However, as the image sensor is smaller, the curvature radius of a bent portion of the flexible circuit board folded to fall inside the outer circumference of the image sensor is reduced. Thus, there is a fear that the flexible circuit board may be broken.

In an imaging device disclosed in JP-A-2015-62555, a rigid circuit board is used. In the rigid circuit board, there is no fear that separation between each terminal of an image sensor and each land of the rigid circuit board or breakage of the rigid circuit board may be caused by bending. However, as the image sensor is smaller, the board thickness of the rigid circuit board is inevitably reduced so that the rigid circuit board can fall inside the outer circumference of the image sensor. When the board thickness is reduced, the strength of the rigid circuit board is lowered. Thus, there is a fear that the rigid circuit board may be broken by an external force or the like acting thereon through electric wires.

The present invention has been developed in consideration of the aforementioned situation. An object of the invention is to make it possible to reduce the diameter of an insertion portion of an endoscope, and to enhance durability thereof.

An endoscope according to an aspect of the invention comprises: an image sensor that is provided at a front end portion of an insertion portion so that an image receiving surface of the image sensor is disposed to cross a longitudinal axis of the insertion portion; a sensor holder that surrounds an outer circumference of the image sensor and holds the image sensor; and a circuit board including a sensor connection portion and an electric wire connection portion, the sensor connection portion being provided with lands connected to terminals provided on an opposite back surface of the image sensor to the image receiving surface, the electric wire connection portion being provided with lands connected to electric wires; wherein the image sensor is held by the sensor holder in a state where a center of the image sensor is displaced from a center of the sensor holder in view along a direction parallel with the longitudinal axis of the insertion portion; the sensor connection portion and the electric wire connection portion are connected to each other on an opposite side to a side where the center of the image sensor is located with respect to the center of the sensor holder; and an outside edge of a connection site between the sensor connection portion and the electric wire connection portion is located on the outside of an outer circumference of the image sensor when the outside means an opposite side to an inside where the center of the image sensor is located in view along a direction parallel with the longitudinal axis of the insertion portion.

According to the invention, it is possible to reduce the diameter of an insertion portion of an endoscope, and it is also possible to enhance durability.

DESCRIPTION OF REFERENCE NUMERALS AND SIGNS 1 endoscope system
2 endoscope
3 light source unit
4 processor unit
5 monitor
6 insertion portion
7 operation portion
8 universal cord
9 connector
10 front end portion
11 bent portion
12 soft portion
14 treatment tool channel
20 imaging device
21 image sensor
22 lens barrel
23 sensor holder
24 flexible circuit board
26 terminal
27 electric wire
30 sensor connection portion
31 electric wire connection portion
33 bent portion (connection site)
40 rigid circuit board
41 sensor connection portion
42 electric wire connection portion
43 corner portion (connection site)

DETAILED DESCRIPTION OF THE INVENTION

Figure 1:
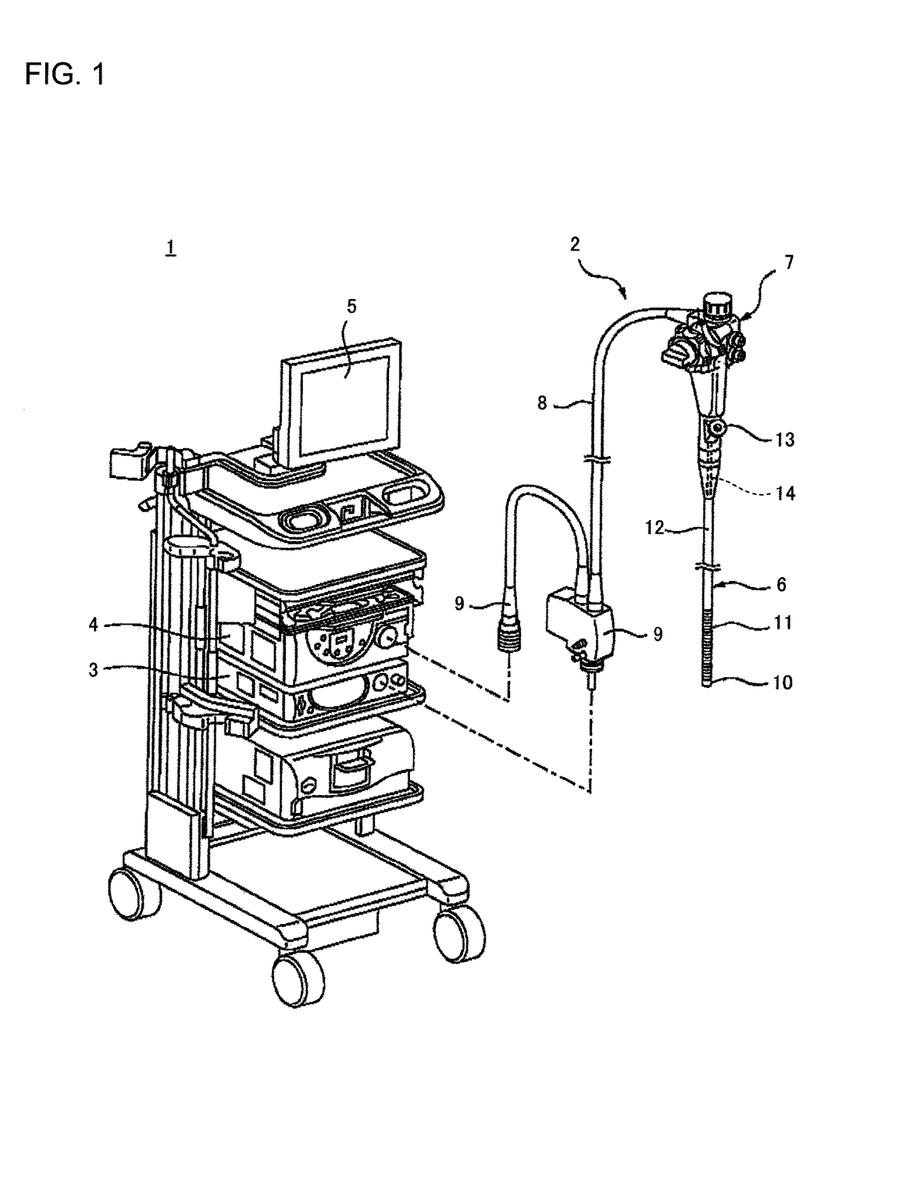
FIG. 1 is a configuration diagram showing an example of an endoscope system for explaining an embodiment of the invention.

FIG. 1 shows an example of an endoscope system for explaining an embodiment of the invention.

An endoscope system 1 has an endoscope 2, a light source unit 3, and a processor unit 4. The endoscope 2 has an insertion portion 6, an operation portion 7, and a universal cord 8. The insertion portion 6 is inserted into a subject to be inspected. The operation portion 7 is connected to the insertion portion 6. The universal cord 8 extends from the operation portion 7. The insertion portion 6 is constituted by a front end portion 10, a bent portion 11, and a soft portion 12. The bent portion 11 is connected to the front end portion 10. The bent portion 11 and the operation portion 7 are connected through the soft portion 12.

The front end portion 10 is provided with an illumination optical system, an imaging device, an imaging optical system, etc. The illumination optical system emits illumination light for lighting a part to be observed. The imaging device and the imaging optical system take an image of the part to be observed. The bent portion 11 is arranged so that it can be bent in a direction perpendicular to the longitudinal axis of the insertion portion 6. The bending operation of the bent portion 11 is operated by the operation portion 7. In addition, the soft portion 12 is arranged to be comparatively soft enough to be deformed following the shape of an insertion path in the insertion portion 6.

The operation portion 7 is provided with a button, a rotary knob, etc. The imaging operation of the imaging device in the front end portion 10 is operated by the button. The bending operation of the bent portion 11 is operated by the rotary knob. An introduction port 13 is also provided in the operation portion 7. A treatment tool such as an electric knife is introduced through the introduction port 13. A treatment tool channel 14 is provided inside the insertion portion 6. The treatment tool channel 14 extends from the introduction port 13 and reaches the front end portion 10. The treatment tool is inserted through the treatment tool channel 14.

A connector 9 is provided at a terminal end of the universal cord 8. The endoscope 2 is connected to the light source unit 3 and the processor unit 4 through the connector 9. The light source unit 3 generates illumination light to be emitted from the illumination optical system in the front end portion 10. The processor unit 4 processes a video signal acquired by the imaging device in the front end portion 10. The processor unit 4 processes the inputted video signal, generates video data of the part to be observed, displays the generated video data on a monitor 5, and records the generated video data.

A light guide and a group of electric wires are received inside the insertion portion 6, the operation portion 7 and the universal cord 8. Illumination light generated by the light source unit 3 is guided to the illumination optical system of the front end portion 10 through the light guide, and signals and electric power are transmitted between the imaging device of the front end portion 10 and the processor unit 4 through the group of electric wires.

Figure 2:
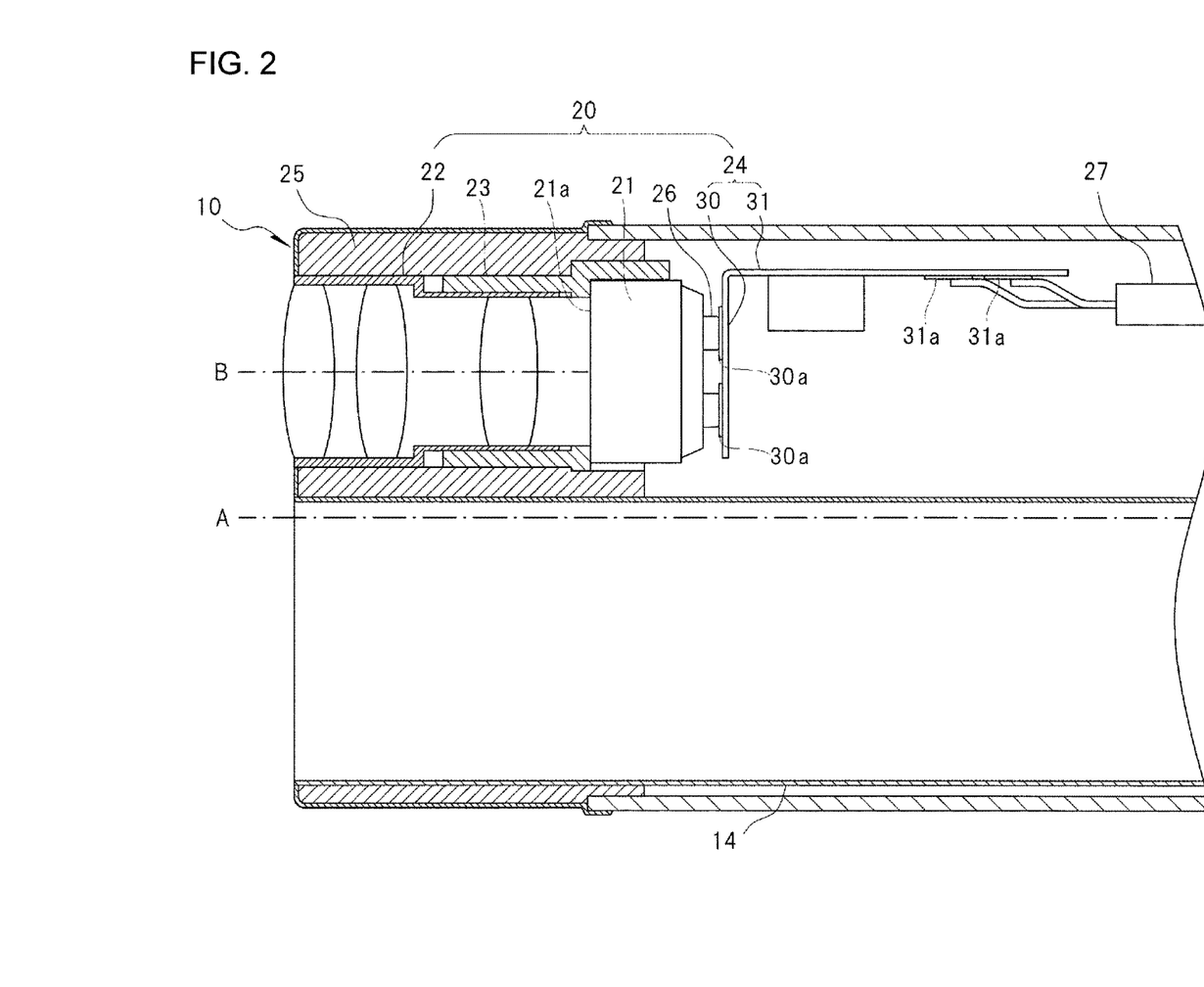
FIG. 2 is a sectional view of a front end portion of an insertion portion of an endoscope in FIG. 1.
Figure 3:
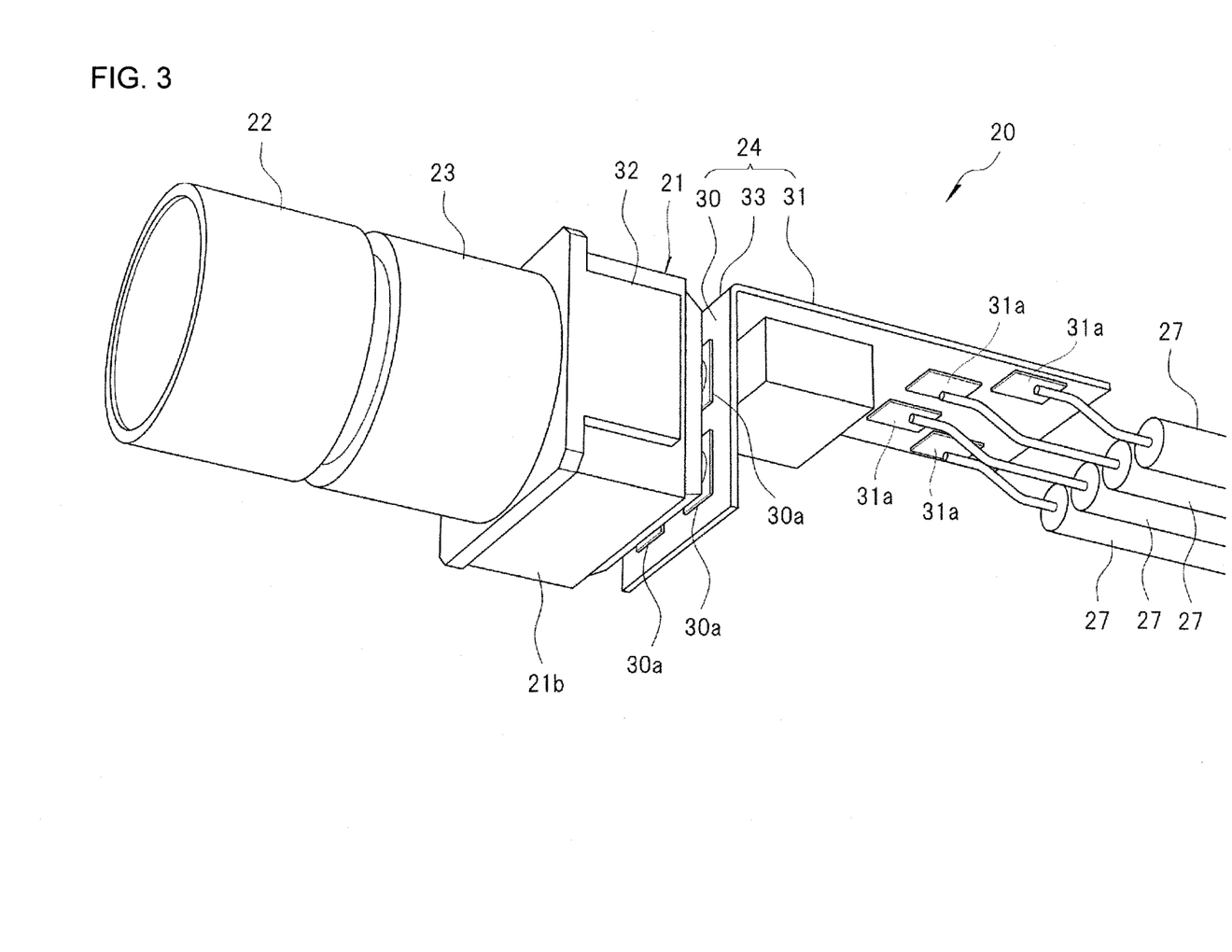
FIG. 3 is a perspective view showing an imaging device mounted on the front end portion of the insertion portion of the endoscope in FIG. 1.
Figure 4:
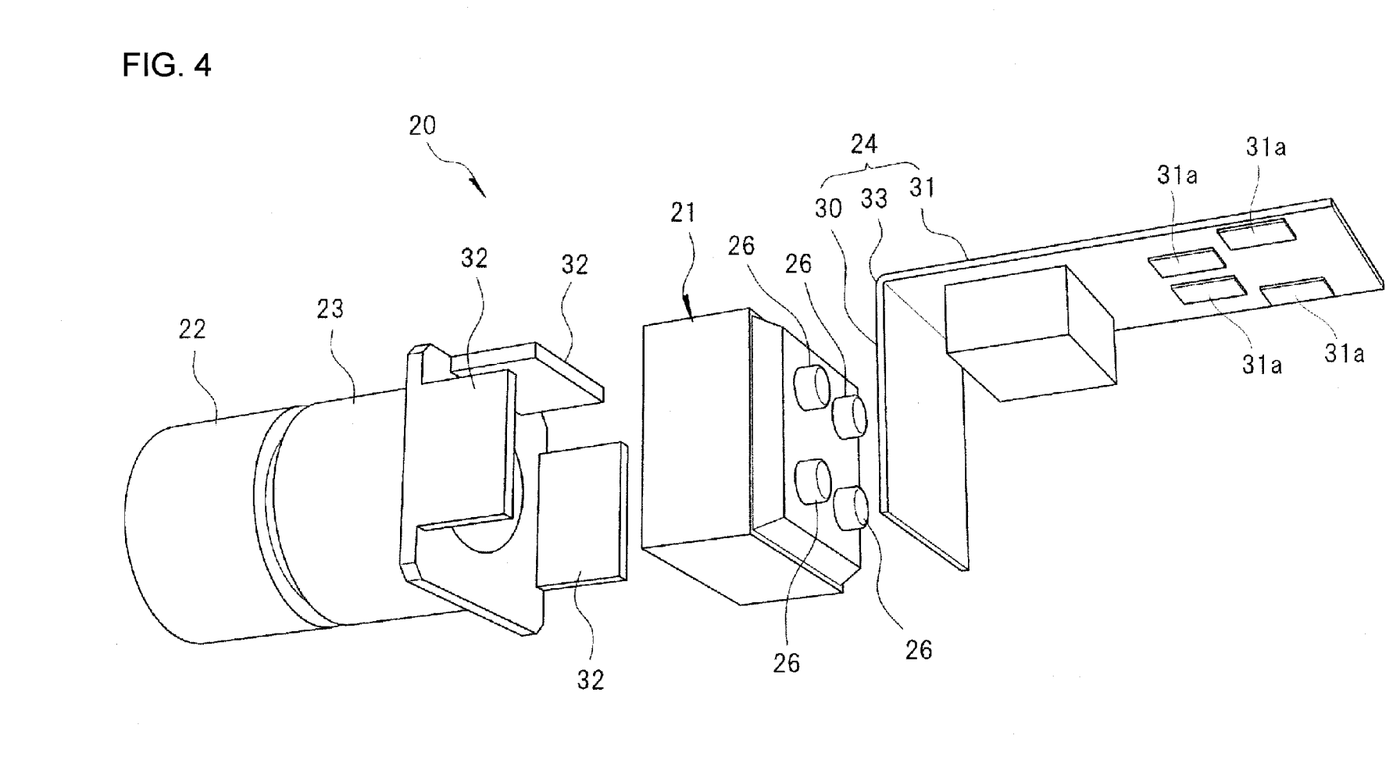
FIG. 4 is an exploded perspective view showing the imaging device in FIG. 3.

FIG. 2 shows the configuration of the inside of the front end portion 10 of the insertion portion 6.

An imaging device 20 and a front end portion of the treatment tool channel 14 are provided in the front end portion 10. In addition, though not shown, an illumination optical system etc. are also provided. Illumination light guided from the light source unit 3 through the light guide is emitted by the illumination optical system.

The imaging device 20 has an image sensor 21 such as a CCD (Charge Coupled Device) image sensor or a CMOS (Complementally Metal Oxide Semiconductor) image sensor, a lens barrel 22 receiving an imaging optical system for forming an image of a subject on an image receiving surface 21a of the image sensor 21, a sensor holder 23 holding the image sensor 21 and the lens barrel 22, and a flexible circuit board 24 mounted with the image sensor 21.

The sensor holder 23 holds the lens barrel 22 movably along an optical axis B of the imaging optical system. The lens barrel 22 can be moved to adjust the position of the image sensor 21 relative to the imaging optical system. The lens barrel 22 is fixed to the sensor holder 23, for example, by a bonding agent or the like after the image sensor 21 is positioned.

The sensor holder 23 holding the image sensor 21 and the lens barrel 22 is received in a reception hole formed in a front end hard portion 25, and fixed to the front end hard portion 25. The front end hard portion 25 is made of a metal material such as a stainless steel material. The front end portion of the treatment tool channel 14 and the illumination optical system are also received in reception holes formed in the front end hard portion 25 respectively, and fixed to the front end hard portion 25.

In the state where the sensor holder 23 has been fixed to the front end hard portion 25, the optical axis B of the imaging optical system received in the lens barrel 22 is disposed substantially in parallel with a longitudinal axis A of the insertion portion 6, and the image receiving surface 21a of the image sensor 21 on which an image of a subject is formed by the imaging optical system is disposed substantially perpendicularly to the longitudinal axis A of the insertion portion 6.

A plurality of terminals 26 are provided on an opposite back surface to the image receiving surface 21a of the image sensor 21. Signals and electric power are inputted and outputted through the terminals 26.

The flexible circuit board 24 mounted with the image sensor 21 has a sensor connection portion 30 and an electric wire connection portion 31.

A plurality of lands are formed in each of the sensor connection portion 30 and the electric connection portion 31. The sensor connection portion 30 is attached to the back surface of the image sensor 21 so that lands 30a of the sensor connection portion 30 can be connected to the terminals 26 provided on the back surface of the image sensor 21. Terminal portions of electric wires 27 are connected to lands 31a of the electric wire connection portion 31. The flexible circuit board 24 and image sensor 21 mounted on the flexible circuit board 24 are connected to the processor unit 4 through the electric wires 27.

The flexible circuit board 24 is bent suitably between the sensor connection portion 30 and the electric wire connection portion 31. The sensor connection portion 30 attached to the back surface of the image sensor 21 is disposed substantially perpendicularly to the longitudinal axis A while the electric wire connection portion 31 is disposed substantially along the longitudinal axis A.

FIG. 3 to FIG. 6 shows the configuration of the imaging device 20.

The sensor holder 23 has three holding pieces 32, which overlap with three of the four side surfaces of the image sensor 21 having a substantially rectangular shape in view along the normal direction of the image receiving surface 21a, respectively. The image sensor 21 is held by the three holding pieces 32 surrounding the outer circumference thereof. The image sensor 21 is fixedly attached to the holding pieces 32 by use of a bonding agent.

In an extremely small image sensor whose outer shape has an area not larger than 1 mm square in view along the normal direction of its image receiving surface, it is difficult to secure a satisfactory bonding area around the image receiving surface. However, as shown in this example, when a plurality of holding pieces 32 overlapping with a plurality of side surfaces of the image sensor 21 respectively are provided in the sensor holder 23 so that the holding pieces 32 can be bonded to the side surfaces of the image sensor 21, a bonding area can be secured so that the joining strength between the image sensor 21 and the sensor holder 23 can be enhanced.

In addition, preferably, the sensor holder 23 is disposed so that, of the four side surfaces of the image sensor 21, an exposed side surface 21b where any holding piece 32 does not overlap can be directed toward the treatment tool channel 14. Thus, there is no holding piece 32 between the image sensor 21 and the treatment tool channel 14, but the image sensor 21 and the sensor holder 23 holding the image sensor 21 can be disposed closely to the treatment tool channel 14. It is therefore possible to reduce the diameter of the insertion portion 6.

Figure 5:
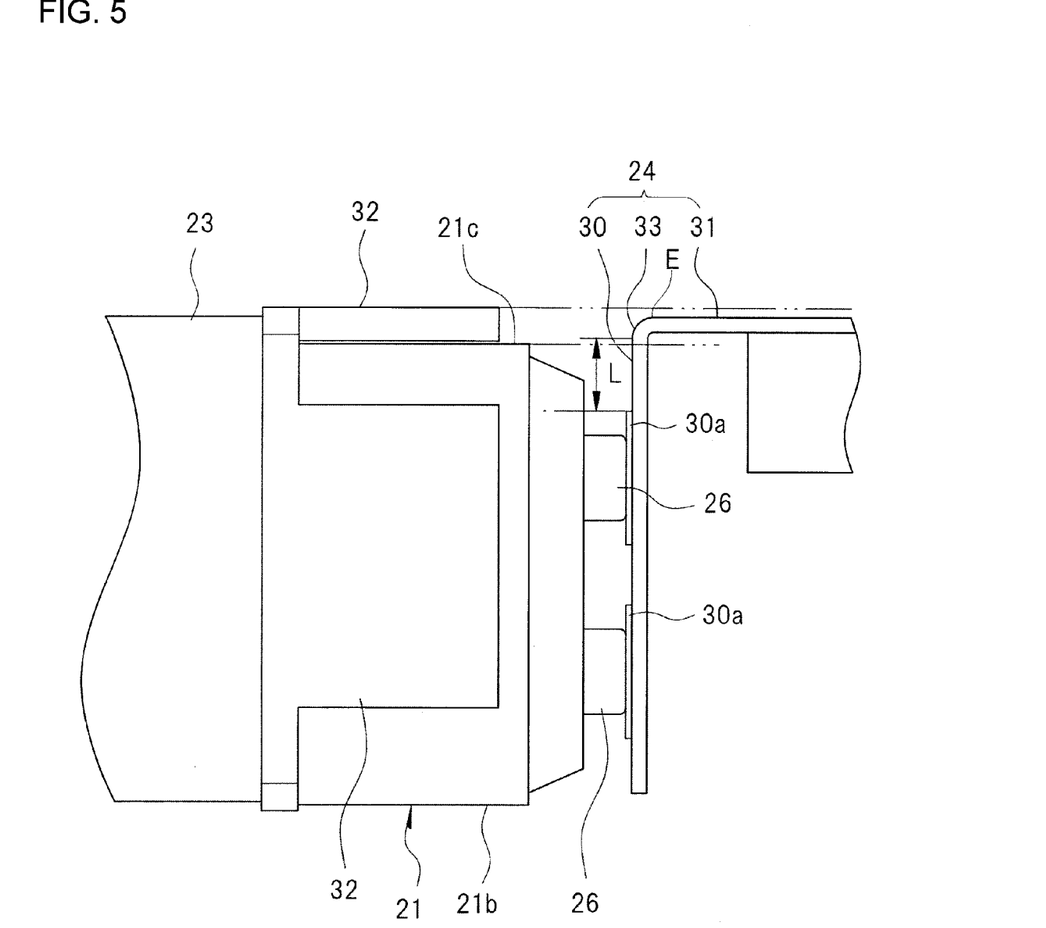
FIG. 5 is a side view showing the imaging device in FIG. 3.
Figure 6:
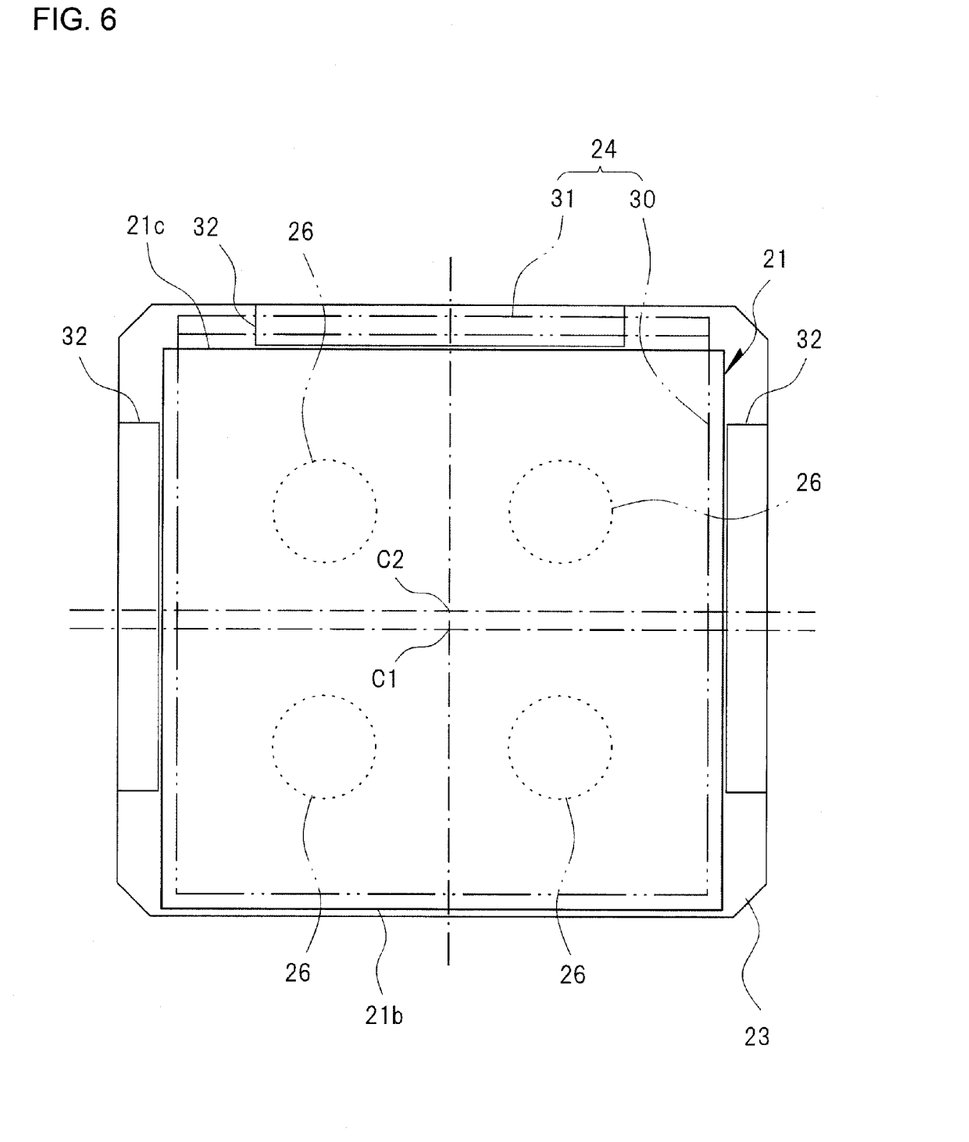
FIG. 6 is a back view showing the imaging device in FIG. 3.

In the aforementioned configuration, as shown in FIG. 5 and FIG. 6, when the image sensor 21 and the sensor holder 23 are observed in parallel with the longitudinal axis A, a center C1 of the image sensor 21 is displaced with respect to a center C2 of the sensor holder 23 toward, of the four side surfaces of the image sensor 21, the exposed side surface 21b where any holding piece 32 does not overlap.

The bent portion 33 forming the connection site between the sensor connection portion 30 and the electric wire connection portion 31 of the flexible circuit board 24 is disposed on the opposite side to the side where the center C1 of the image sensor 21 is located with respect to the center C2 of the sensor holder 23, that is, on the side of a side surface 21c opposed to the exposed side surface 21b of the image sensor 21.

Observed in parallel with the longitudinal axis A, an outside edge E of the bent portion 33 is located outside the outer circumference of the image sensor 21, and further the outer circumference of the flexible circuit board 24 including the outside edge E of the bending portion 33 is located inside the outer circumference of the sensor holder 23. Incidentally, it is noted that the outside edge of the connection site between the sensor connection portion and the electric wire connection portion of the circuit board is an edge exposed to the outside on the assumption that the outside means the opposite side to the inside of the connection site where the center C1 of the image sensor 21 is located. It is also noted that the edge is an outline where the connection site is curved as in the bent portion 33 in this example.

When the outside edge E of the bent portion 33 is disposed outside the outer circumference of the image sensor 21, the curvature radius of the bent portion 33 can be kept to be a proper curvature radius not to generate breakage, and a distance L between each land 30a of the sensor connection portion 30 and the bending start point of the bent portion 33 on the sensor connection portion 30 side can be expanded. As a result, separation between each terminal 26 of the image sensor 21 and each land 30a of the sensor connection portion 30 caused by bending of the flexible circuit board 24 can be suppressed to enhance the durability of the imaging device 20.

In addition, when the position of the center C1 of the image sensor 21 relative to the center C2 of the sensor holder 23 is displaced toward the side surface 21b of the image sensor 21, an area between the outer circumference of the image sensor 21 and the outer circumference of the sensor holder 23 can be expanded on the side of the side surface 21c opposed to the side surface 21b while the size of the outer circumference of the sensor holder 23 is not changed. Due to the bent portion 33 disposed on the side of the side surface 21c, the outer circumference of the flexible circuit board 24 including the outside edge E of the bent portion 33 can fall, for example, inside the outer circumference of the sensor holder 23 as in the illustrated example even when the proper curvature radius of the bent portion 33 is kept and the distance L between each land 30a of the sensor connection portion 30 and the bending start point of the bent portion 33 on the sensor connection portion 30 side is expanded. Otherwise, even if the outer circumference of the flexible circuit board 24 protrudes from the outer circumference of the sensor holder 23, the protruding degree can be suppressed. In this manner, it is possible to reduce the diameter of the insertion portion 6.

The aforementioned configuration of the imaging device 20 is useful particularly in a case where the image sensor 21 is an extremely small image sensor whose outer shape is, for example, not larger than 1 mm square in view along the normal direction of the image receiving surface 21a, and the flexible circuit board 24 is also formed as an extremely small circuit board following the image sensor 21.

Figure 7:
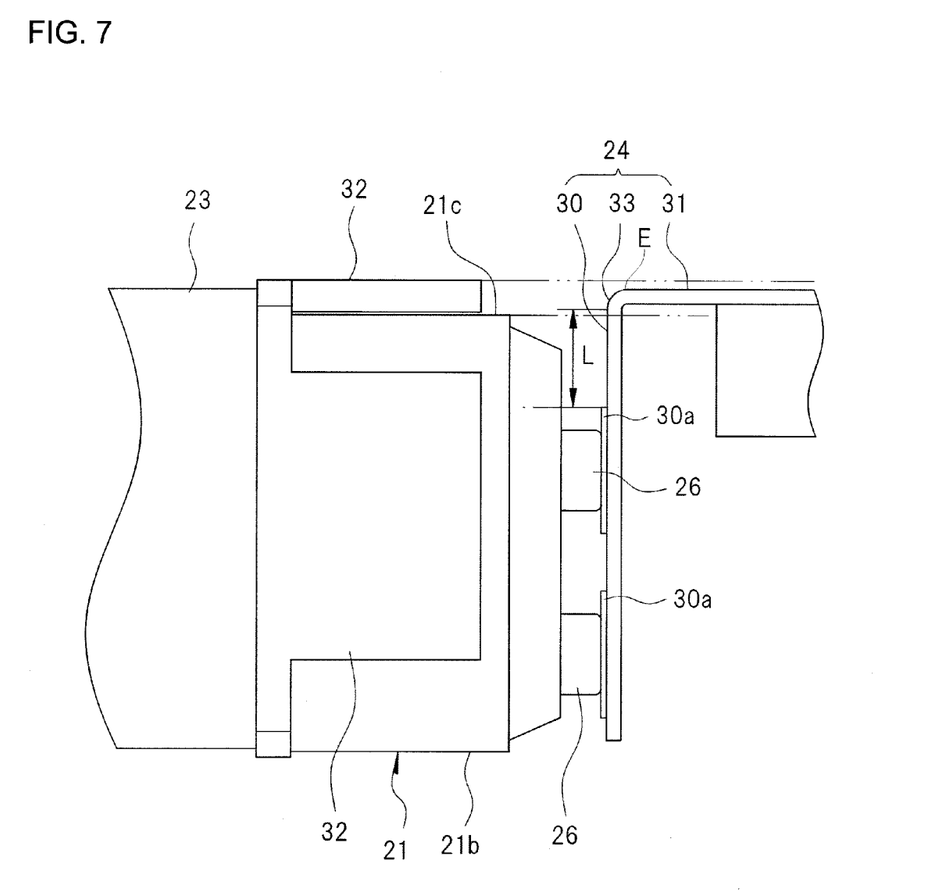
FIG. 7 is a side view showing a modification of the imaging device in FIG. 3.
Figure 8:
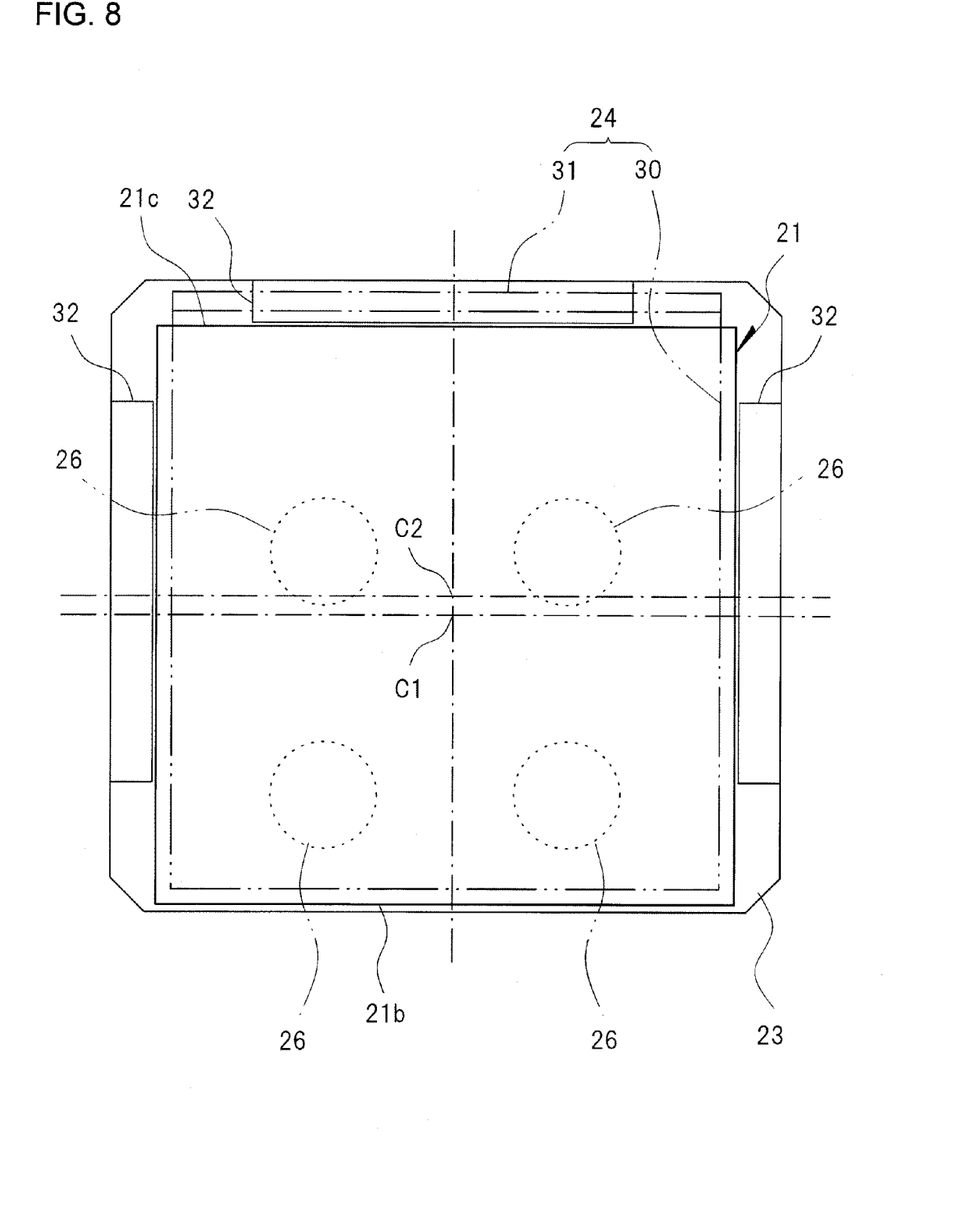
FIG. 8 is a back view of the imaging device in FIG. 7.

FIG. 7 and FIG. 8 show the configuration of a modification of the aforementioned imaging device 20.

In the example shown in FIG. 7 and FIG. 8, the terminals 26 of the image sensor 21 are provided on the back surface of the image sensor 21 so as to be displaced in the displacement direction of the center C1 of the image sensor 21 relative to the center C2 of the sensor holder 23, that is, to be displaced on the side surface 21b side of the image sensor 21.

Since the bent portion 33 of the flexible circuit board 24 is disposed on the side of the side surface 21c opposed to the side surface 21b of the image sensor 21, the distance L between each of the lands 30a of the sensor connection portion 30, which will be connected to the terminals 26 provided to be displaced on the side surface 21b side, and the bending start point of the bent portion 33 on the sensor connection portion 30 side can be further expanded so that the durability of the imaging device can be enhanced. In addition, the outer circumference of the flexible circuit board 24 including the outside edge E of the bent portion 33 can fall easily inside the outer circumference of the sensor holder 23. Thus, the diameter of the insertion portion 6 can be reduced.

Description has been made on the assumption that the circuit board mounted with the image sensor 21 is a flexible circuit board. However, the circuit board may be a rigid circuit board.

Figure 9:
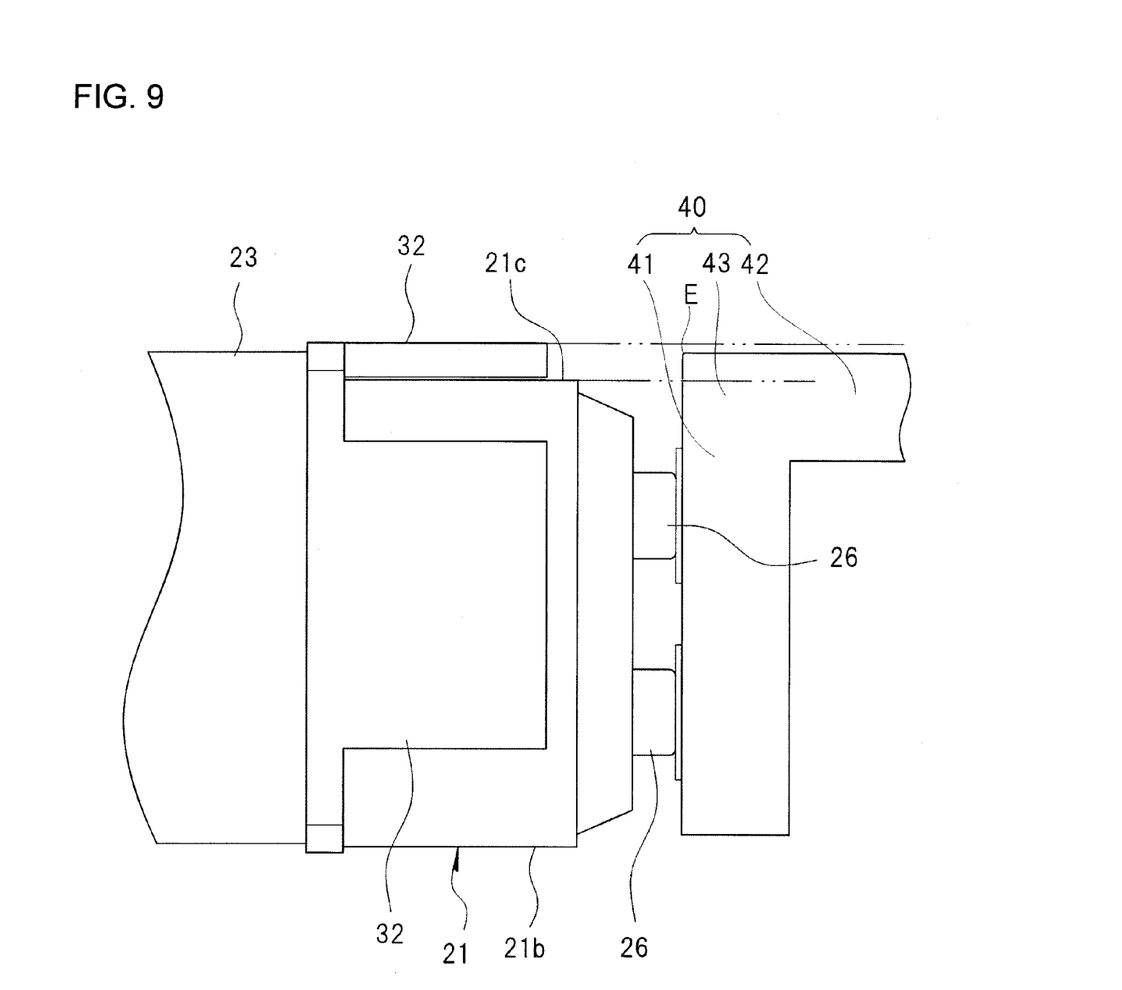
FIG. 9 is a side view showing a modification of the imaging device in FIG. 3.
Figure 10:
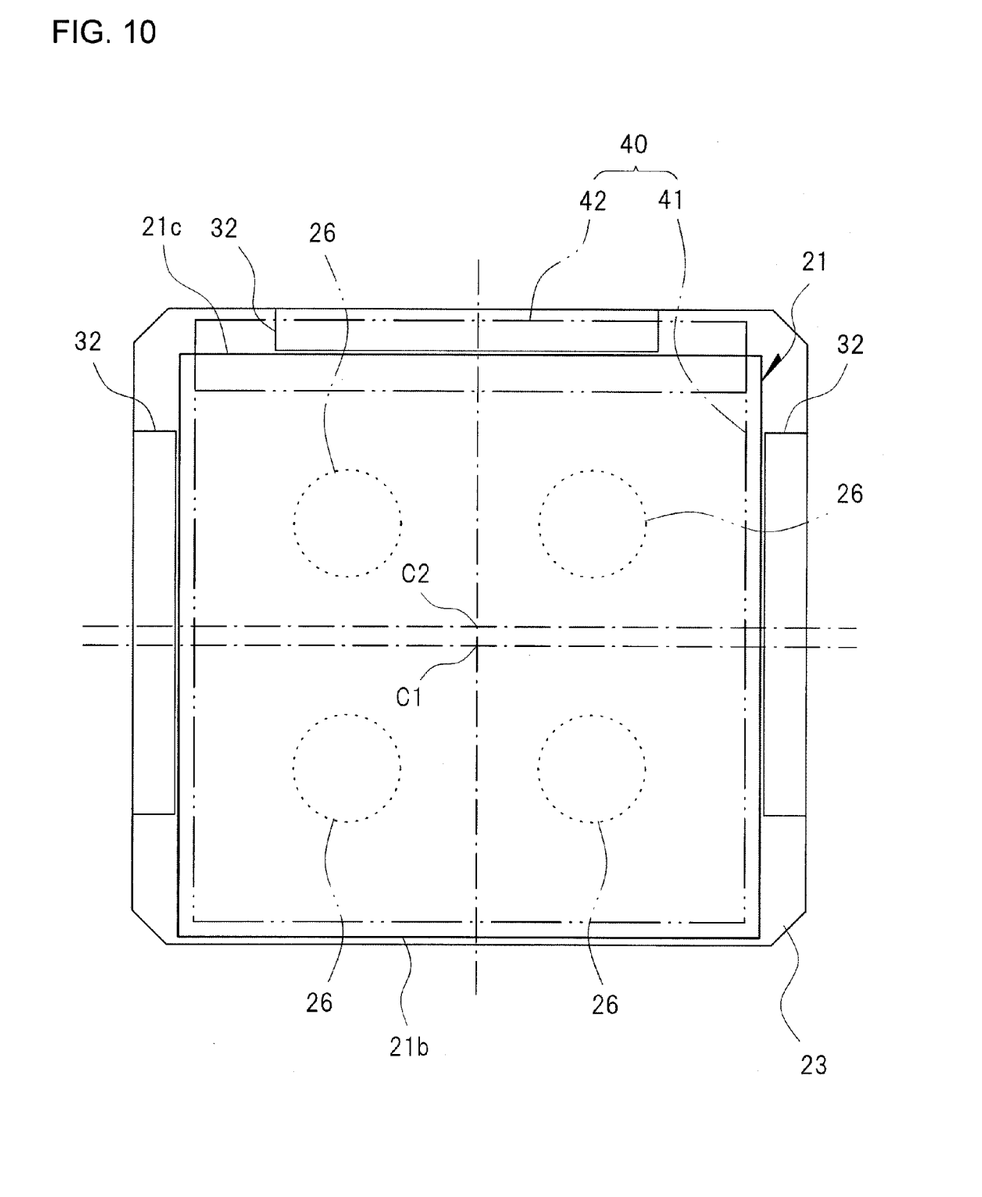
FIG. 10 is a back view of the imaging device in FIG. 9.

FIG. 9 and FIG. 10 show the configuration of a modification of the aforementioned imaging device 20.

In the example shown in FIG. 9 and FIG. 10, the image sensor 21 is mounted on a rigid circuit board 40. The rigid circuit board 40 includes a sensor connection portion 41 and an electric wire connection portion 42. The sensor connection portion 41 is attached to the back surface of the image sensor 21 and disposed substantially perpendicularly to the longitudinal axis A (see FIG. 2) of the insertion portion 6. The electric wire connection portion 42 is disposed substantially along the longitudinal axis A. The sensor connection portion 41 and the electric wire connection portion 42 cross each other substantially at right angles. The connection site between the two is formed as a corner portion 43.

When the image sensor 21 and the sensor holder 23 are observed in parallel with the longitudinal axis A, the position of the center C1 of the image sensor 21 relative to the center C2 of the sensor holder 23 is displaced toward the exposed side surface 21b. Of the four side surfaces of the image sensor 21, the side surface 21b does not overlap with any holding piece 32.

The corner portion 43 forming the connection site between the sensor connection portion 41 and the electric wire connection portion 42 of the rigid circuit board 40 is disposed on the opposite side to the side where the center C1 of the image sensor 21 is located with respect to the center C2 of the sensor holder 23, that is, on the side of the side surface 21c opposed to the exposed side surface 21b of the image sensor 21.

Observed in parallel with the longitudinal axis A, an outside edge E of the corner portion 43 is located outside the outer circumference of the image sensor 21, and further the outer circumference of the rigid circuit board 40 including the outside edge E of the corner portion 43 is located inside the outer circumference of the sensor holder 23.

As described above, the position of the center C1 of the image sensor 21 relative to the center C2 of the sensor holder 23 is displaced on the side of the side surface 21b of the image sensor 21 so that the area between the outer circumference of the image sensor 21 and the outer circumference of the sensor holder 23 can be expanded on the side of the side surface 21c opposed to the side surface 21b while the size of the outer circumference of the sensor holder 23 is not changed. Accordingly, when the corner portion 43 forming the connection site between the sensor connection portion 41 and the electric wire connection portion 42 of the rigid circuit board 40 is disposed on the side of the side surface 21c of the image sensor 21 and the outside edge E of the corner portion 43 is disposed outside the outer circumference of the image sensor 21, the outer circumference of the rigid circuit board 40 including the outside edge E of the corner portion 43 can fall inside the outer circumference of the sensor holder 23 so as to reduce the diameter of the insertion portion 6, while the board thickness of the electric wire connection portion 42 of the rigid circuit board 40 is increased to enhance the strength of the electric wire connection portion 42.

As has been described above, an endoscope disclosed in the present specification includes: an image sensor that is provided at a front end portion of an insertion portion so that an image receiving surface of the image sensor is disposed to cross a longitudinal axis of the insertion portion; a sensor holder that surrounds an outer circumference of the image sensor and holds the image sensor; and a circuit board including a sensor connection portion and an electric wire connection portion, the sensor connection portion being provided with lands connected to terminals provided on an opposite back surface of the image sensor to the image receiving surface, the electric wire connection portion being provided with lands connected to electric wires; wherein: the image sensor is held by the sensor holder in a state where a center of the image sensor is displaced from a center of the sensor holder in view along a direction parallel with the longitudinal axis of the insertion portion; the sensor connection portion and the electric wire connection portion are connected to each other on an opposite side to a side where the center of the image sensor is located with respect to the center of the sensor holder; and an outside edge of a connection site between the sensor connection portion and the electric wire connection portion is located on the outside of an outer circumference of the image sensor when the outside means an opposite side to an inside where the center of the image sensor is located in view along a direction parallel with the longitudinal axis of the insertion portion.

In addition, in the endoscope disclosed in the present specification, an outer circumference of the circuit board may be located inside the outer circumference of the sensor holder in view along a direction parallel with the longitudinal axis of the insertion portion.

In addition, in the endoscope disclosed in the present specification, the circuit board may be a flexible circuit board, and the connection site between the sensor connection portion and the electric wire connection portion may be bent.

In addition, in the endoscope disclosed in the present specification, the terminals may be provided on the back surface of the image sensor so as to be displaced in a displacement direction of the center of the image sensor relative to the center of the sensor holder.

In addition, in the endoscope disclosed in the present specification, the circuit board may be a rigid circuit board.

In addition, in the endoscope disclosed in the present specification, an outer shape of the image sensor may be not larger than 1 mm square in view along a normal direction of the image receiving surface of the image sensor.

Although the invention has been described above in relation to preferred embodiments and modifications thereof, it will be understood by those skilled in the art that other variations and modifications can be effected in these preferred embodiments without departing from the scope and spirit of the invention.

What is claimed is:

1. An endoscope comprising:
an image sensor that is provided at a front end portion of an insertion portion of the endoscope so that an image receiving surface of the image sensor is disposed to cross a longitudinal axis of the insertion portion;
a sensor holder that surrounds an outer circumference of the image sensor and holds the image sensor; and
a circuit board comprising a sensor connection portion and an electric wire connection portion, the sensor connection portion being provided with lands connected to terminals provided on a back surface of the image sensor opposite to the image receiving surface facing towards the sensor holder, the electric wire connection portion being provided with lands connected to electric wires, and the circuit board being disposed away from the sensor holder and completely separated from the sensor holder; wherein
the image sensor is held by the sensor holder in a state where a center of the image sensor is displaced from a center of the sensor holder in view along a direction parallel with the longitudinal axis of the insertion portion;
the sensor connection portion and the electric wire connection portion are connected to each other on an opposite side to a side where the center of the image sensor is located with respect to the center of the sensor holder; and
an outside edge of a connection site between the sensor connection portion and the electric wire connection portion is located on an outside of an outer circumference of the image sensor when the outside is defined to be an opposite side to an inside where the center of the image sensor is located in view along a direction parallel with the longitudinal axis of the insertion portion.

2. The endoscope according to claim 1, wherein an outer circumference of the circuit board is located inside an outer circumference of the sensor holder in view along a direction parallel with the longitudinal axis of the insertion portion.

3. The endoscope according to claim 2, wherein the circuit board is a flexible circuit board, and the connection site between the sensor connection portion and the electric wire connection portion is bent.

4. The endoscope according to claim 3, wherein the terminals are provided on the back surface of the image sensor so as to be displaced in a displacement direction of the center of the image sensor relative to the center of the sensor holder.

5. The endoscope according claim 4, wherein an area of an outer shape of the image sensor is not larger than 1 mm square in view along a normal direction of the image receiving surface of the image sensor.

6. The endoscope according claim 3, wherein an area of an outer shape of the image sensor is not larger than 1 mm square in view along a normal direction of the image receiving surface of the image sensor.

7. The endoscope according to claim 2, wherein the circuit board is a rigid circuit board.

8. The endoscope according claim 7, wherein an area of an outer shape of the image sensor is not larger than 1 mm square in view along a normal direction of the image receiving surface of the image sensor.

9. The endoscope according claim 2, wherein an area of an outer shape of the image sensor is not larger than 1 mm square in view along a normal direction of the image receiving surface of the image sensor.

10. The endoscope according to claim 1, wherein the circuit board is a flexible circuit board, and the connection site between the sensor connection portion and the electric wire connection portion is bent.

11. The endoscope according to claim 10, wherein the terminals are provided on the back surface of the image sensor so as to be displaced in a displacement direction of the center of the image sensor relative to the center of the sensor holder.

12. The endoscope according claim 11, wherein an area of an outer shape of the image sensor is not larger than 1 mm square in view along a nonnal direction of the image receiving surface of the image sensor.

13. The endoscope according claim 10, wherein an area of an outer shape of the image sensor is not larger than 1 mm square in view along a normal direction of the image receiving surface of the image sensor.

14. The endoscope according to claim 1, wherein the circuit board is a rigid circuit board.

15. The endoscope according claim 14, wherein an area of an outer shape of the image sensor is not larger than 1 mm square in view along a normal direction of the image receiving surface of the image sensor.

16. The endoscope according claim 1, wherein an area of an outer shape of the image sensor is not larger than 1 mm square in view along a normal direction of the image receiving surface of the image sensor.

* * * * *